March 14, 1944.  H. AUSLANDER  2,343,947
WING NUT
Filed Aug. 12, 1942

INVENTOR.
Henry Auslander
BY
Zoltan Polachek
ATTORNEY

Patented Mar. 14, 1944

2,343,947

UNITED STATES PATENT OFFICE 2,343,947

WING NUT

Henry Auslander, Brooklyn, N. Y.

Application August 12, 1942, Serial No. 454,516

3 Claims. (Cl. 85—32)

This invention relates to new and useful improvements in wing nuts.

More particularly, the invention proposes to characterize the new wing nut by the fact that it is constructed from a strip of sheet metal of substantially rectangular shape with square bent portions thereof superimposed and having a pair of lugs along its sides bent and fashioned to simulate the wings of a wing nut.

The invention is not limited to any particular form of blank from which the wing nut is constructed. Any number of such forms, and any number of ways of bending the same may be developed. Several such modifications will be given in this specification.

Still further, in a modified form, the invention contemplates the provision of small prongs connecting the superimposed square bent portions to hold them from shifting laterally when the nut is being screwed down, under pressure, by using the wings.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 4:
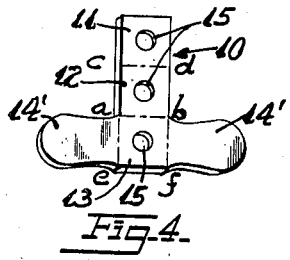
Fig. 4 is a perspective view of the blank from which the wing nut was constructed.

The wing nut, in accordance with the form of invention illustrated in Figs. 1-4, comprises a strip of sheet metal 10 of substantially rectangular shape with square portions 11, 12 and 13 bent therefrom and superimposed, and having a pair of lugs 14 along its sides bent and fashioned to simulate the wings of a wing nut. The lugs 14 are bent and fashioned from the lug blanks 14' as shown in Fig. 4. These lug blanks 14' are located on opposite sides of the first one of said square portions, namely, the square portion 13. It is intended that the square portion 12 be bent along the line $ab$ and superimposed on the portion 13, and that the portion 11 be bent along the line $cd$ and located beneath the portion 13. The lug blanks 14' are bent upwards along the lines $ae$ and $bf$ and are also concave to add to their rigidity. The three superimposed bent portions are then drilled and tapped, indicated by reference numeral 15. The wing nut may then be engaged upon a screw 15$^a$, bolt or the like.

Figure 5:
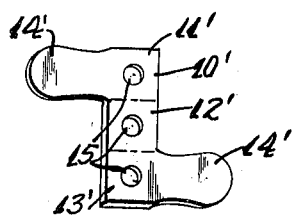
Fig. 5 is a perspective view of a modified form of blank for constructing a wing nut in accordance with this invention.

In Fig. 5 a modified form of blank is shown for making a wing nut in accordance with this invention. More specifically, the blank 10' is of substantially rectangular shape and may be divided into the several square portions 11', 12', and 13' which may be bent to be superimposed on each other. The blank 10' is also provided with lug blank portions 14' which are located along the sides thereof, and more particularly, one of these lug portions is on one side of the portion 11' while the other lug portion is on the other side of the portion 13'. In other respects this form of the invention is identical to the previous form.

Figure 1:
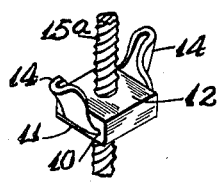
Fig. 1 is a perspective view of a wing nut constructed in accordance with this invention and shown on a screw.
Figure 6:
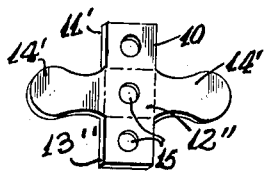
Fig. 6 is another perspective view of another modified form of blank.
Figure 7:
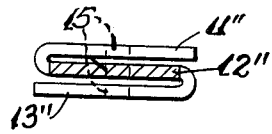
Fig. 7 is a sectional view of a wing nut formed from the blank shown in Fig. 6.
Figure 2:
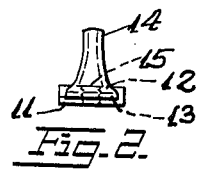
Fig. 2 is an end elevational view of the wing nut shown in Fig. 1.
Figure 8:
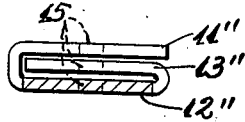
Fig. 8 is another sectional view of a wing nut bent differently from the blank shown in Fig. 6.
Figure 3:
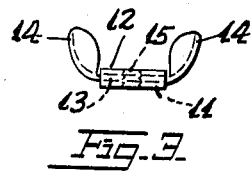
Fig. 3 is a side elevational view of the wing nut shown in Fig. 1.

In Figs. 6-8 other forms of the invention are shown which are very similar to the prior forms, distinguishing merely in the location of the lug blanks 14' and the bending of the blank to form the wing nuts. In accordance with this form of the invention the strip 10 may be divided into three square portions 11'', 12'' and 13''. The lug blanks 14' are arranged on opposite sides of the central portion 12''. The end square portions 11'' and 13'' may be bent, respectively, above and below the central portion 12' as illustrated in Fig. 7. In Fig. 8 another way of bending the blank is shown in which the square portions 11' and 12' are superimposed on the central square portion 12'.

Figure 9:
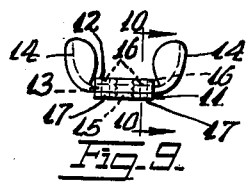
Fig. 9 is a side elevational view of a wing nut constructed in accordance with another form of this invention.
Figure 10:
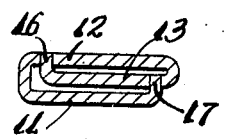
Fig. 10 is a vertical sectional view taken on the line 10—10 of Fig. 9.

In Figs. 9 and 10 still another form of the invention is disclosed which is very similar to the form shown in Figs. 1-4, distinguishing in the fact that a plurality of spaced prongs 16 are formed upon the end of the portion 13 and engage in complementary receiving openings formed in the portion 12, while other spaced prongs 17 from the portion 11 engage in complementary openings in the portion 13. The interengagement of these prongs hold the various superimposed portions from shifting. This is particularly valuable when the wing nut is being used by turning on the wings thereof. This is a more rigid construction, and hence the wing nut may be made from thinner gauge sheet material.

Figure 11:
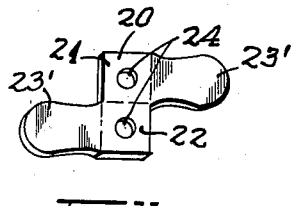
Fig. 11 is a perspective view of another blank from which a wing nut may be constructed in accordance with another form of this invention.
Figure 12:
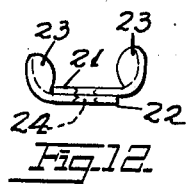
Fig. 12 is a side elevational view of a wing nut constructed from the blank shown in Fig. 11.

In Figs. 11 and 12 still another form of the invention is shown in which the wing nut is formed from a strip of sheet metal 20 substantially of rectangular shape having square bent portions 21 and 22 thereof superimposed and having a pair of lugs 23 along its sides bent and fashioned to simulate the wings of a wing nut. The superimposed portions 21 and 22 are drilled and tapped, indicated by reference numeral 24. The lugs 23 are formed from lug blanks 23' located upon opposite sides of the said portions 21 and 22 respectively.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A wing nut, comprising a strip of sheet metal of substantially rectangular shape with substantially square bent portions thereof superimposed and having a pair of integral lugs along its sides bent and fashioned to simulate the wings of a wing nut, said lugs extending normally from opposite sides of one of said bent portions.

2. A wing nut, comprising a strip of sheet metal of substantially rectangular shape with substantially square bent portions thereof superimposed and having a pair of lugs along its sides bent and fashioned to simulate the wings of a wing nut, and small spaced prongs from one of the portions engaging complementary openings in the adjacent portion.

3. A wing nut, comprising a strip of substantially rectangular sheet metal divided into a plurality of substantially square portions bent one on the other, a pair of lugs extending outwards from the sides of said strip of sheet metal and bent and fashioned to simulate the wings of a wing nut, and prongs formed on the edges of the endmost square portions of said strip of metal and bent to engage complementary openings formed in the square portions adjacent said endmost square portions.

HENRY AUSLANDER.